(12) United States Patent
Nakamura

(10) Patent No.: US 9,880,790 B2
(45) Date of Patent: Jan. 30, 2018

(54) IMAGE FORMING APPARATUS, IMAGE FORMING METHOD, AND STORAGE MEDIUM FOR REDUCING A CONSUMPTION AMOUNT OF COLOR MATERIAL

(71) Applicant: CANON KABUSHIKI KAISHA, Tokyo (JP)

(72) Inventor: Yasuyuki Nakamura, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/925,673

(22) Filed: Oct. 28, 2015

(65) Prior Publication Data

US 2016/0124688 A1 May 5, 2016

(30) Foreign Application Priority Data

Oct. 31, 2014 (JP) .................. 2014-223577

(51) Int. Cl.
*G06K 15/12* (2006.01)
*G03G 15/36* (2006.01)
*G06F 3/12* (2006.01)
*G03G 15/00* (2006.01)
*G06K 15/02* (2006.01)

(52) U.S. Cl.
CPC ....... *G06F 3/1219* (2013.01); *G03G 15/5025* (2013.01); *G03G 15/556* (2013.01); *G06F 3/1234* (2013.01); *G06K 15/128* (2013.01); *G06K 15/1869* (2013.01)

(58) Field of Classification Search
CPC .................................... G06F 3/1219
USPC ............................................ 399/27
See application file for complete search history.

(56) References Cited

U.S. PATENT DOCUMENTS

2009/0033644 A1* 2/2009 Kawaguchi .......... G09G 3/3216
345/205
2009/0214238 A1* 8/2009 Tanaka ............... H04N 1/40037
399/51
2010/0172595 A1* 7/2010 Tsunematsu ............. G06K 9/44
382/258

FOREIGN PATENT DOCUMENTS

JP       2007-272153 A     10/2007

* cited by examiner

*Primary Examiner* — Walter L Lindsay, Jr.
*Assistant Examiner* — Philip Marcus T Fadul
(74) *Attorney, Agent, or Firm* — Canon U.S.A., Inc. IP Division

(57) ABSTRACT

An image forming apparatus includes a setting unit configured to set a thinning amount smaller than one pixel for each line data in a high density area in image data, a comparison unit configured to compare the thinning amount set by the setting unit with a predetermined threshold, and a processing unit configured to execute, based on a result of comparison by the comparison unit, a thinning process by using a thinning amount larger than the thinning amount set by the setting unit or a thinning amount smaller than the thinning amount set by the setting unit as for M pixels out of N pixels (N>M) contained in the line data, and a thinning process by using the thinning amount set by the setting unit as for the rest of the N pixels contained in the line data.

7 Claims, 15 Drawing Sheets

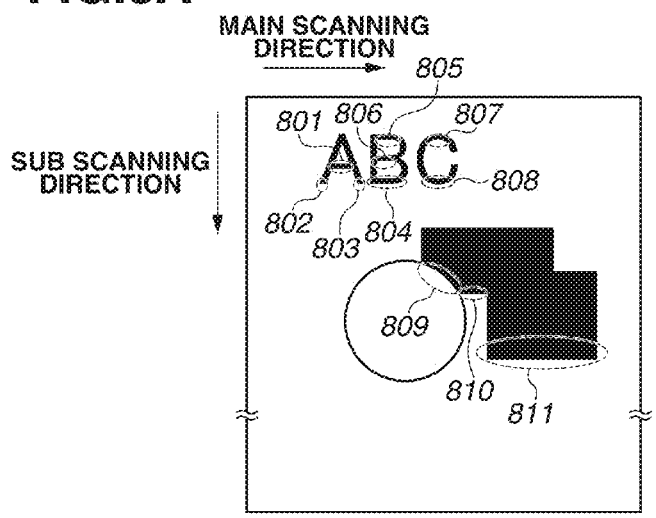
FIG.8A
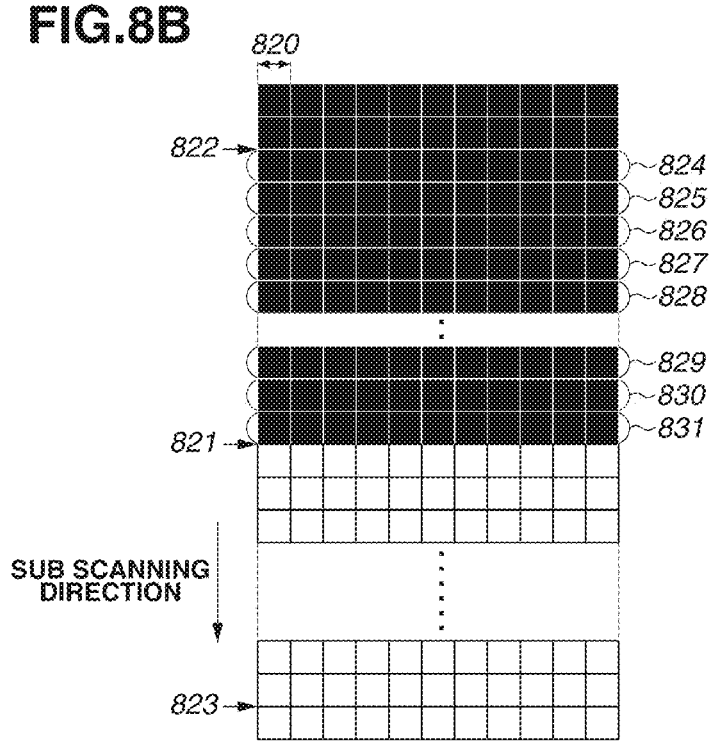
FIG.8B
FIG.8C

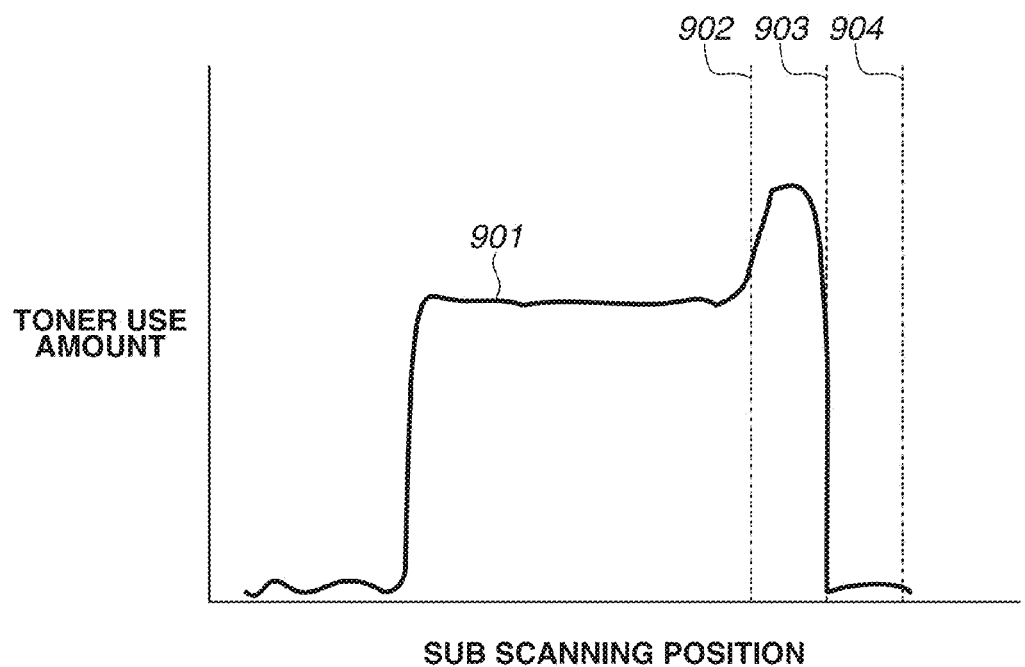

FIG.12A
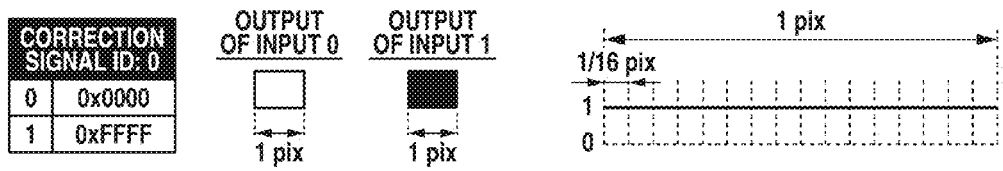
FIG.12B
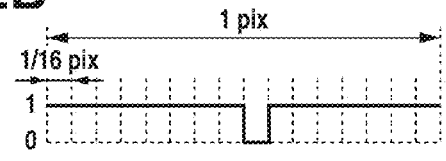
FIG.12C
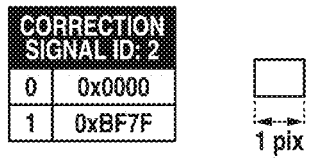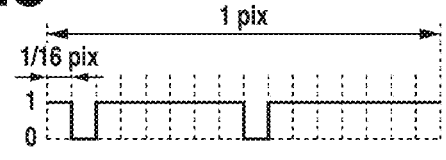
FIG.12D
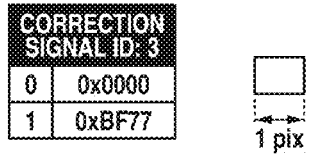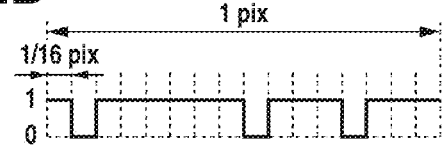
FIG.12E
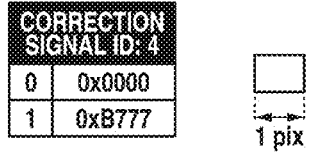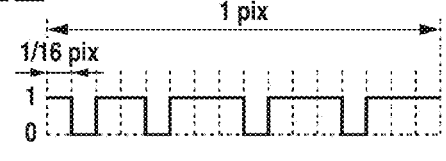
FIG.12F
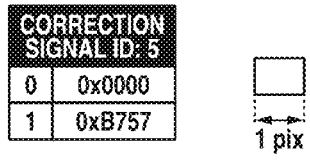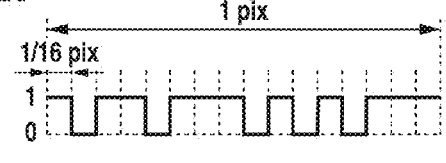

IMAGE FORMING APPARATUS, IMAGE FORMING METHOD, AND STORAGE MEDIUM FOR REDUCING A CONSUMPTION AMOUNT OF COLOR MATERIAL

BACKGROUND OF THE INVENTION

Field of the Invention

The present disclosure generally relates to image forming and, more particularly, to an image forming apparatus, an image forming method, a storage medium, and to a technique for reducing a consumption amount of color material such as toner.

Description of the Related Art

There is a strong demand for reduction of a toner amount consumed by an image forming apparatus. A technique for reducing a toner consumption amount by lowering exposure intensity in an image area having a predetermined dimension has been proposed.

There is a phenomenon known as a sweep-up, which produces such a state that a developing toner amount at a rear end of a latent image becomes larger than a developing toner amount at a flat portion of the latent image. Regarding this phenomenon, Japanese Patent Application Laid-Open No. 2007-272153 discusses a technique for replacing high density image data at a rear end of a latent image with low density image data as appropriate, to adjust an exposure amount and correct a sweep-up.

SUMMARY OF THE INVENTION

According to the technique discussed in Japanese Patent Application Laid-Open No. 2007-272153, however, adjustment of an exposure amount for every other pixel may generate particular high-frequency components with respect to frequency components contained in document image data. Thus, the technique is problematic in that radiation noise produced by the image forming apparatus increases.

The present disclosure is directed to an image forming apparatus having the following configuration.

According to an aspect of the present disclosure, an image forming apparatus includes a setting unit configured to set a thinning amount smaller than one pixel for each line data in a high density area in image data, a comparison unit configured to compare the thinning amount set by the setting unit with a predetermined threshold, and a processing unit configured to execute, based on a result of comparison by the comparison unit, a thinning process by using a thinning amount larger than the thinning amount set by the setting unit or a thinning amount smaller than the thinning amount set by the setting unit as for M pixels out of N pixels (N>M) contained in the line data, and a thinning process by using the thinning amount set by the setting unit as for the rest of the N pixels contained in the line data.

According to the present disclosure, both of assurance of density and suppression of high-frequency component generation can be achieved by thinning of pixel values.

Further features of the present disclosure will become apparent from the following description of exemplary embodiments with reference to the attached drawings.

BRIEF DESCRIPTION OF THE DRAWINGS

FIGS. 8A to 8C are diagrams illustrating sweep-up target areas.

FIG. 9 is a graph indicating toner amounts consumed by the sweep-up phenomenon.

FIGS. 12A to 12F are diagrams illustrating correction signal identifications (IDs) and PWM control.

DESCRIPTION OF THE EMBODIMENTS

<Image Forming Apparatus>

Figure 1:
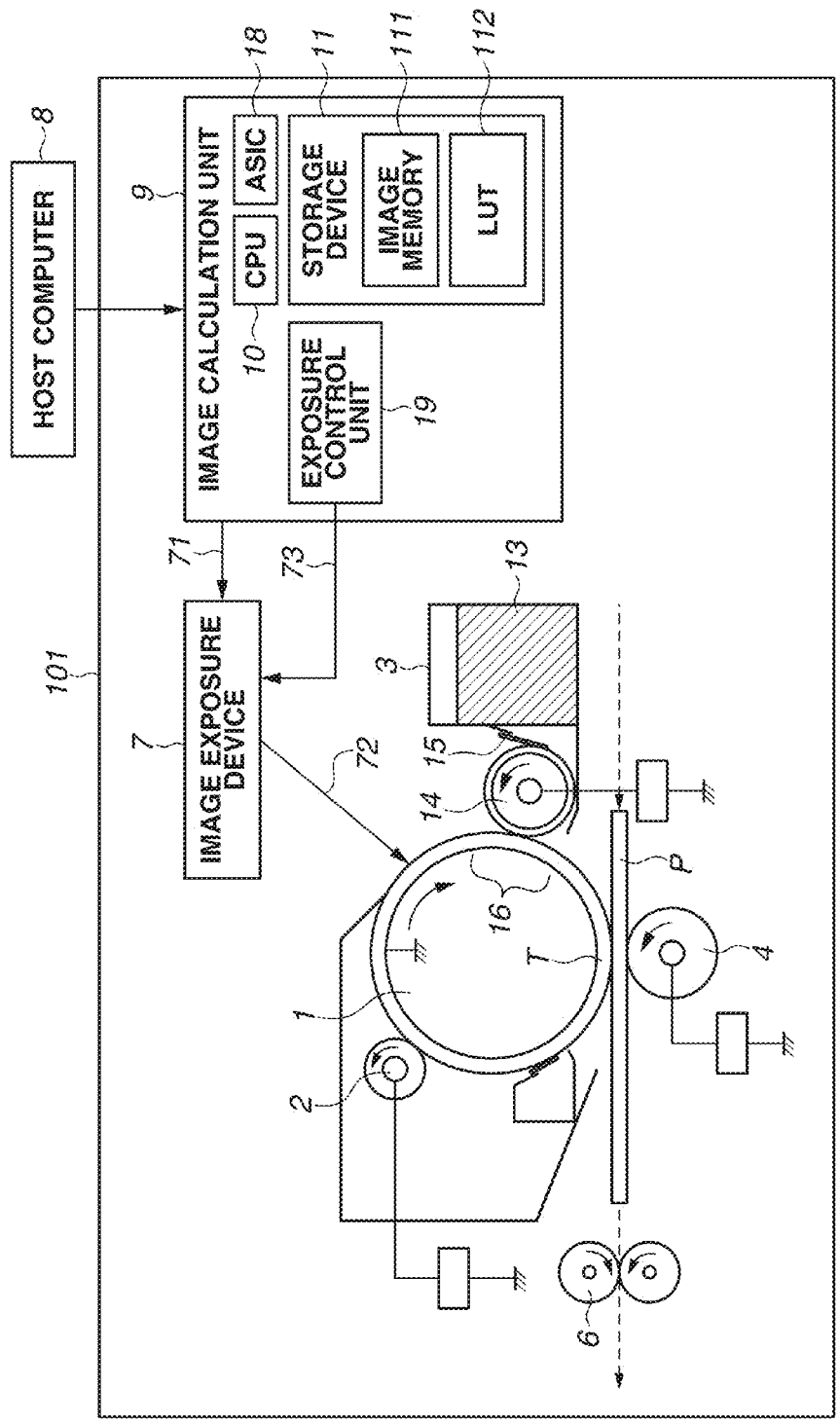
FIG. 1 is a general cross-sectional view of an image forming apparatus.

An operation of an image forming apparatus 101 according to a first exemplary embodiment is hereinafter described with reference to FIG. 1. The image forming apparatus 101 includes a drum-shaped electrophotographic photosensitive member (hereinafter referred to as "photosensitive drum") 1 serving as an image bearing member. A charging device 2, which serves as a charging unit such as a charging roller, uniformly charges a surface of the photosensitive drum 1. An exposure device 7, which serves as an exposure unit such as a laser beam scanner device and a surface emitting element, exposes the uniformly charged photosensitive drum 1 by emitting thereto an amount of light based on image data. Accordingly, exposure is performed by using laser beams. An electrostatic latent image is formed on the surface of the photosensitive drum 1 as a result of the exposure. As used herein, the term "unit" generally refers to any combination of software, firmware, hardware, or other component, such as circuitry, that is used to effectuate a purpose.

The exposure device 7 receives a driving signal 71 for driving the exposure device 7 from an image calculation unit 9, and emits light information 72 to the photosensitive drum 1 based on the driving signal 71 to form an electrostatic latent image. An exposure control unit 19 outputs a light amount adjustment signal 73 to the exposure device 7 as a signal for adjustment of a target light amount during the exposure. This configuration allows supply of a constant amount of current to the exposure device 7, thereby maintaining constant exposure intensity. Gradation expression of an image is achieved by adjusting a light amount for each pixel based on the target light amount as a criterion, or by adjusting an emission time through pulse width modulation.

The image calculation unit 9 executes a correction process for reducing a toner consumption amount. According to the present exemplary embodiment, a toner consumption amount is reduced by suppressing adhesion of an excessive amount of toner caused by a sweep-up. The image calculation unit 9 receives raster data (image data) transmitted from an image scanner or a host computer 8, and executes the correction process based on the received data to reduce the toner consumption amount. The "sweep-up" in this context refers to a phenomenon which produces such a state that an excessive amount of developing agent adheres to a rear end of an electrostatic latent image in a conveying direction. This excessive adhesion of developing agent not only lowers reproducibility of image density with respect to document density, but also causes excessive consumption of the developing agent. Suppression of excessive consumption of the developing agent realizes saving of the developing agent. The principle of generation of the sweep-up will be described below.

A central processing unit (CPU) 10 is a control unit that integrally controls the entire image forming apparatus 101. The CPU 10 functions as a correction unit or a correction control unit for correcting pixel values of pixels where the sweep-up of a developing agent may possibly occur, among a plurality of pixels constituting image data, to reduce the sweep-up of the developing agent. The CPU 10 may function as a specifying unit for specifying pixels to which an excessive amount of developing agent is applied due to the sweep-up of the developing agent among a plurality of pixels constituting image data. A part or all of the functions of the CPU 10 described below may be executed by an application specific integrated circuit (ASIC) 18. A storage device 11 includes an image memory 111 and a look up table (LUT) 112. The image memory 111 is a storage area (e.g., page memory and line memory) in which image data subjected to image formation is loaded. The LUT 112 stores correction values of exposure amounts associated with reduction of the sweep-up. For example, a correction value for an area or a pixel position where the sweep-up occurs is read from the LUT 112. Accordingly, the LUT 112 of the storage device 11 functions as a storage unit for storing areas and pixel positions in association with correction amounts of pixel values. However, the LUT 112 may function as a storage unit for storing areas and pixel positions in association with a number of pixels. This configuration allows the CPU 10 to easily specify a pixel to be a correction target. The exposure control unit 19 executes automatic power control (APC) of a light source of the exposure device 7 to set a target light amount.

A developing device 3 serving as a developing unit includes a toner container for accommodating and storing a developing agent (hereinafter referred to as "toner") 13, and a developing roller 14 serving as a developing agent bearing member. While the toner 13 used herein is nonmagnetic and one-component toner, the toner 13 may be two-component toner or magnetic toner. The layer thickness of the toner 13 supplied to the developing roller 14 is regulated by a regulation blade 15 functioning as a toner layer thickness regulating member. The regulation blade 15 may be configured to provide electric charges to the toner 13. The toner 13 regulated to have a predetermined layer thickness and provided with a predetermined amount of electric charges is conveyed to a developing area 16 by the developing roller 14. The developing area 16 is an area where the developing roller 14 and the photosensitive drum 1 contact each other, and is also an area where adhesion of toner is performed. An electrostatic latent image formed on the surface of the photosensitive drum 1 is developed with the toner 13, and is converted into a toner image. The toner image formed on the surface of the photosensitive drum 1 is transferred onto transfer material P at a transfer position T by a transfer device 4. The toner image transferred onto the transfer material P is conveyed to a fixing device 6. The fixing device 6 applies heat and pressure to the toner image and the transfer material P to fix the toner image to the transfer material P.

<Developing System>

Figure 2:
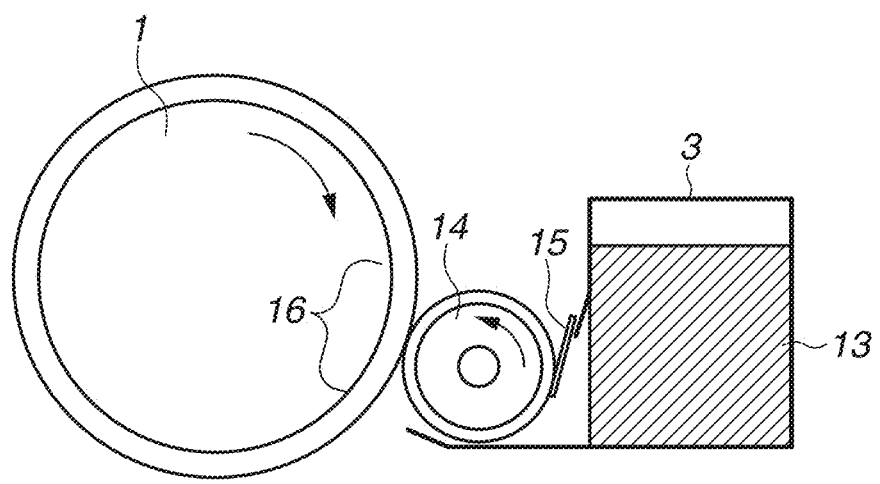
FIG. 2 is a diagram illustrating a developing system.

A developing system is described with reference to FIG. 2. Major developing systems include a jumping developing system and a contact developing system. The contact developing system relates to the sweep-up. The contact developing system is a system which develops the toner 13 by applying a developing voltage (direct current bias) between the developing roller 14 and the photosensitive drum 1 at the developing area 16, which is the narrowest portion between the photosensitive drum 1 and the developing roller 14 in a state of contacting each other. FIG. 2 illustrates an example of the developing device 3 which employs the contact developing system. The photosensitive drum 1 and the developing roller 14 rotate in the same direction at different circumferential speeds. A direct current voltage is applied as a developing voltage between the photosensitive drum 1 and the developing roller 14. The developing voltage is set to have the same polarity as the polarity of a charge potential on the surface of the photosensitive drum 1. The toner 13 thinned on the developing roller 14 is conveyed to the developing area 16 to develop an electrostatic latent image formed on the surface of the photosensitive drum 1.

<Principle of Generation of Sweep-Up>

Figure 3A:
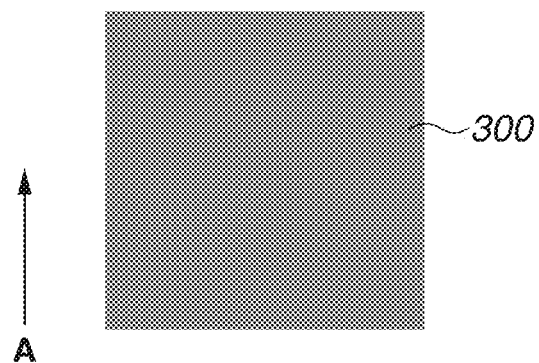
FIGS. 3A and 3B are diagrams illustrating a sweep-up phenomenon.
Figure 3B:
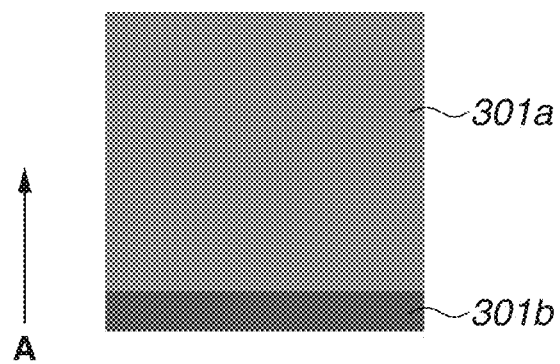

A sweep-up in the contact developing system is described. The sweep-up in this context is a phenomenon which produces such a state that the toner 13 gathers on an edge of a rear end of an image formed on the photosensitive drum 1 as illustrated in FIG. 3B. The rear end in this context refers to a rear end of a toner image in a toner image conveying direction indicated by an arrow A (rotational direction of the photosensitive drum 1). When the sweep-up is generated, a density at a rear end edge 301b of image data 300 illustrated in FIG. 3A becomes higher in comparison with a density at a non-edge portion 301a as illustrated in FIG. 3B. Thus, the consumption amount of the toner 13 increases, or the excessive amount of toner 13 not contributing to density reproduction is used for the rear end edge 301b.

Figure 4A:
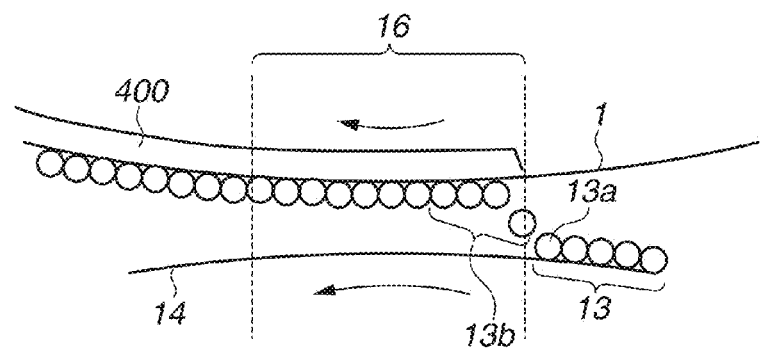
FIGS. 4A to 4C are diagrams illustrating a principle of generation of the sweep-up phenomenon.
Figure 4B:
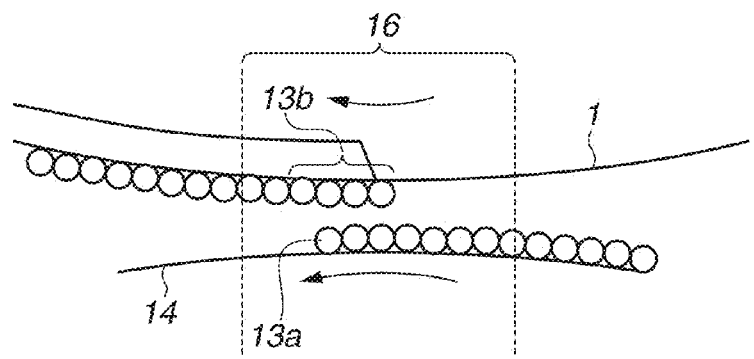
Figure 4C:
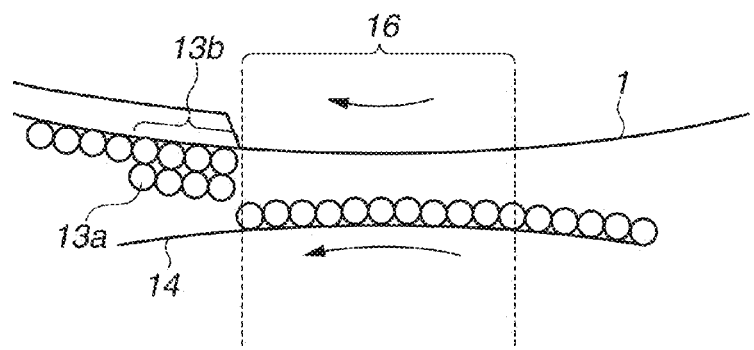

According to the contact developing system, as illustrated in FIGS. 4A to 4C, the circumferential speed of the developing roller 14 is made higher than the circumferential speed of the photosensitive drum 1 to adjust the height of the toner on the photosensitive drum 1 to a predetermined height. This structure realizes stable supply of the toner 13 to the photosensitive drum 1, thereby maintaining the image density at the target density. As illustrated in FIG. 4A, an electrostatic latent image is developed at the developing area 16 using the toner 13 conveyed by the developing roller 14. Since the developing roller 14 rotates at a higher speed than the speed of the photosensitive drum 1, the positional relationship between the surfaces of the developing roller 14 and the photosensitive drum 1 is constantly changing and deviating from each other. When a rear end of an electrostatic latent image 400 enters the developing area 16, toner 13a on the developing roller 14 before a start position of the developing area 16 is positioned posterior to a rear end 13b of the electrostatic latent image 400 in the rotational direction at as illustrated in FIG. 4A. Then, the toner 13a on the developing roller 14 overtakes the rear end 13b of the electrostatic latent image 400 before the rear end 13b of the electrostatic latent image 400 leaves the developing area 16 as illustrated in FIG. 4B. The toner 13a having overtaken the rear end 13b of the electrostatic latent image 400 is supplied to the rear end 13b as illustrated in FIG. 4C. As a result, the developing amount at the rear end 13b increases. This mechanism is considered a factor for generating the sweep-up.

The sweep-up phenomenon does not necessarily occur at every rear end edge of image data input from the host computer 8. The sweep-up phenomenon occurs in a high density area at an edge portion where a high density is switched to a low density in a case where high density image data (black image data) continues for a predetermined number of lines in a sub scanning direction, and then low density image data (white image data) continues for a predetermined number of lines. This is because in a case where an electrostatic latent image 400 is followed by a small number of low density lines which is interposed between the electrostatic latent image 400 and a high density electrostatic latent image which follows the small number of low density lines, the toner 13a is supplied not only to the rear end of the electrostatic latent image 400, but also dispersedly to the front end of the high density electrostatic latent image subsequent to the electrostatic latent image 400 In this case, the sweep-up phenomenon which supplies the excessive amount of toner 13 only to the rear end edge does not occur. In addition, a high density continuation number, and a low density continuation number are dependent on the configuration of the image forming apparatus. According to the present exemplary embodiment described below, it is assumed that each of the high density continuation number and the low density continuation number is set to 15 lines.

<Control Method of Exposure Device>

Figure 5:
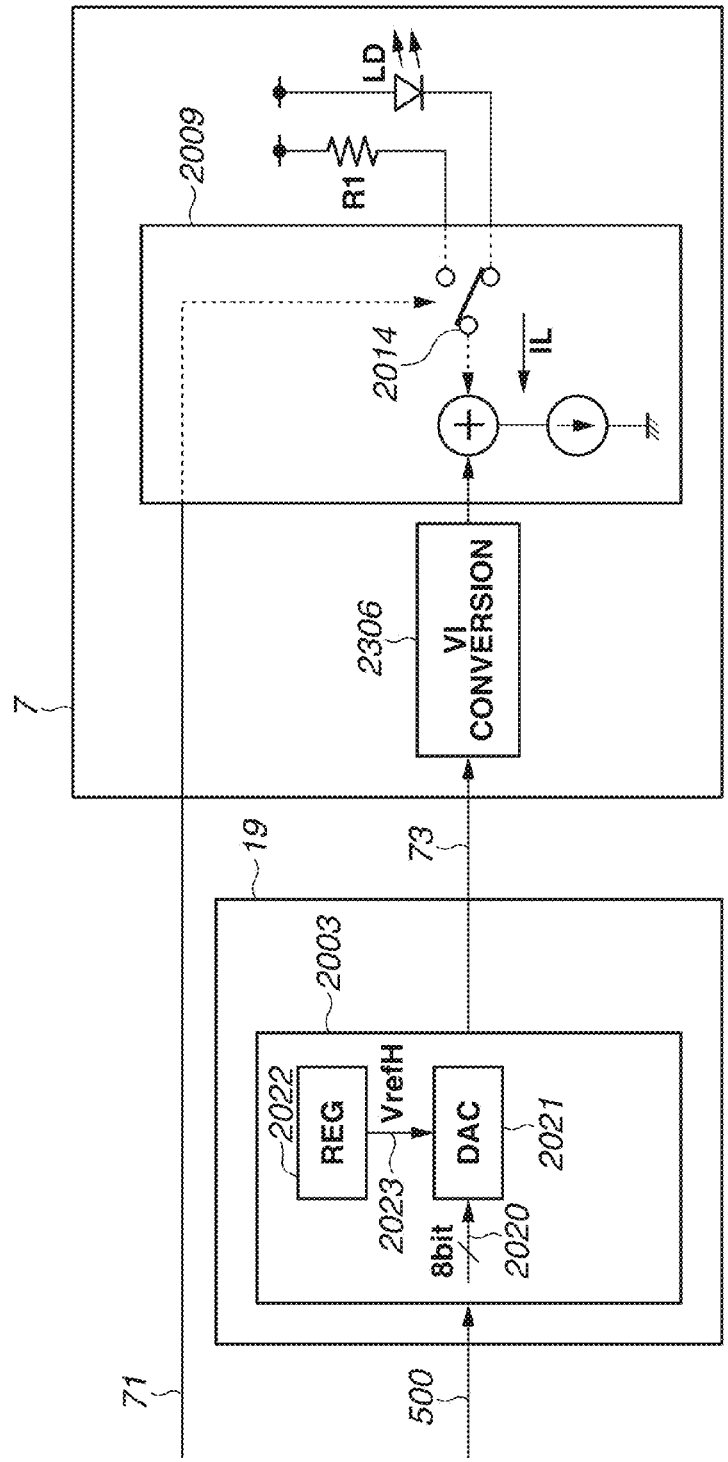
FIG. 5 is a diagram illustrating a configuration of an exposure device.
Figure 7:
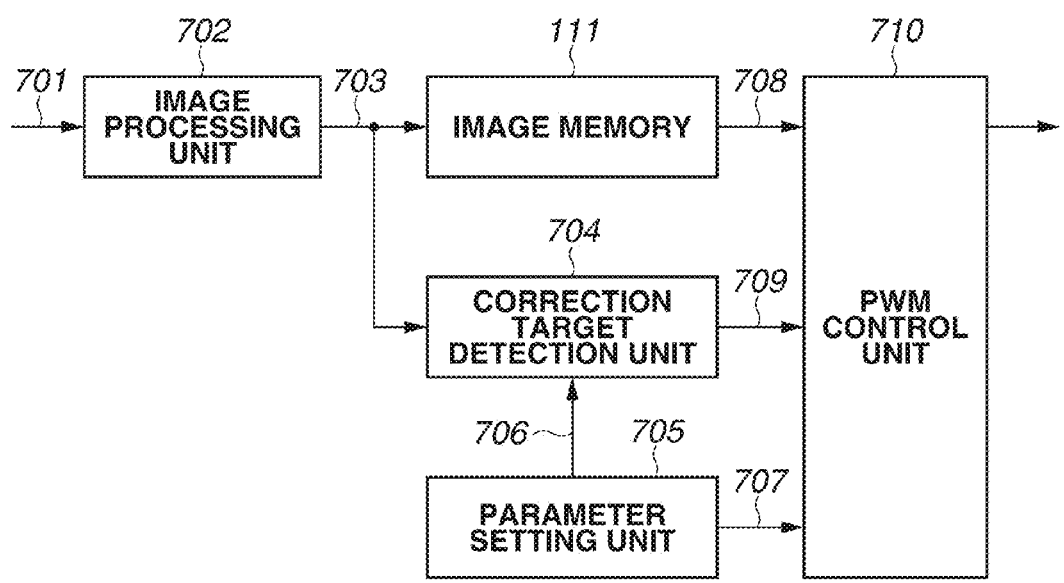
FIG. 7 is a block diagram illustrating a configuration for correcting the sweep-up phenomenon.

A control method of the exposure device 7 is described with reference to FIG. 5. An exposure control unit 19 includes an integrated circuit (IC) 2003 containing an 8-bit digital-to-analog (DA) converter 2021 and a regulator 2022, and generates and transmits a signal for controlling the exposure device 7. The exposure device 7 includes a voltage-current (VI) conversion circuit 2306 for converting voltage to current, a laser driver IC 2009, and a semiconductor laser laser diode (LD). The IC 2003 adjusts a voltage VrefH output from the regulator 2022 based on a light amount adjustment signal 500 indicating a driving current of the semiconductor laser LD set by the CPU 10. The voltage VrefH corresponds to a reference voltage of the DA converter 2021. When the IC 2003 sets input data 2020 for the DA converter 2021, the DA converter 2021 outputs a light amount correction analog voltage Va. The VI conversion circuit 2306 converts the light amount correction analog voltage Va into a current value Id, and outputs the current value Id to the laser driver IC 2009. In FIG. 7, the IC 2003 mounted on the exposure control unit 19 outputs a light amount correction analog voltage Va. However, the DA converter 2021 may also be mounted on the exposure device 7 and generate the light amount correction analog voltage Va near the laser driver IC 2009. The laser driver IC 2009 flips a switch 2014 according to a driving signal 71 output from the image calculation unit 9. The switch 2014 controls ON/OFF of emission from the semiconductor laser LD by switching flow of a current IL between flow toward the semiconductor laser LD and flow toward a dummy resistance R1.

<Exposure Amount Correction Method>

Figure 6A:
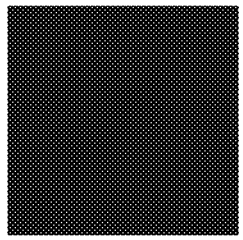
FIGS. 6A to 6C are diagrams illustrating a method for correcting an exposure amount.
Figure 6B:
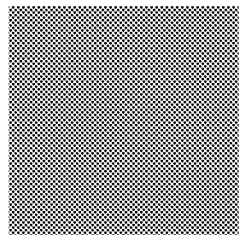
Figure 6C:
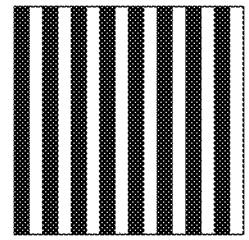

FIG. 6A illustrates an image formed by exposing one pixel at a 100% of a target light amount. FIG. 6B illustrates an image formed by exposing one pixel at a light amount reduced to 50% of the target light amount. This image is produced by reducing exposure intensity to 50%, or reducing a density (gradation value) of a toner image to half. FIG. 6C illustrates an image formed by dividing each pixel into N (N: 2 or a larger natural number) sub pixels, and thinning a part of the sub pixels. This image is produced by pulse width modulation (PWM) at 100% of the target light amount, for example. The PWM can be performed by dividing each pixel into 16 sub pixels, and driving the semiconductor laser LD such that only odd-numbered sub pixels can be exposed, for example.

<Correction of Sweep-Up>

Reduction of a consumption amount of the toner 13 used for an area where the sweep-up occurs by correcting image data used for forming an electrostatic latent image will be described below. First, parameters, which are conditions for occurrence of the sweep-up and dependent on the configuration of the image forming apparatus, are stored in a parameter setting unit included in the image calculation unit 9. The parameters in this context refer to parameters used for determining an area where the sweep-up occurs based on the configuration of the image forming apparatus. The parameters herein indicate continuity (continuous lines) of a high density image in the sub scanning direction, and continuity (continuous lines) of a low density image in the sub scanning direction. Relationships between the parameters and correction values of exposure amounts for reduction of the sweep-up phenomenon are obtained beforehand based on experiments or simulations, and stored in the LUT 112.

A configuration for correcting the sweep-up phenomenon is described with reference to FIG. 7. A correction process for reducing the sweep-up phenomenon is executed by the CPU 10 or the ASIC 18 included in the image calculation unit 9. In this process, exposure intensity is corrected to decrease an excessive amount of toner produced by the sweep-up. There are two methods for correcting exposure intensity.

One of the methods is a method for correcting the driving signal 71 of the exposure device 7. The other method is a method for correcting the light amount adjustment signal 73. The correction process executed to correct the sweep-up is a process for correcting pixel values of target pixels, among a plurality of pixels constituting image data, where the sweep-up of the developing agent occurs, to reduce an edge effect of the developing agent. The correction process may include a step for specifying pixels to which an excessive amount of developing agent is applied due to the sweep-up of developing agent, from a plurality of pixels constituting image data, for example. Moreover, the correction process may include a step for obtaining a pixel area constituted by pixels having values equal to or larger than a predetermined value from a plurality of pixels constituting image data, and specifying a predetermined number of pixels as pixels to which an excessive amount of developing agent has been applied, out of pixels positioned at an edge of the obtained pixel area.

Image data 701 transmitted from the host computer 8 is subjected to image processing by an image processing unit 702. The image processing unit 702 is constituted by a program of the CPU 10, or an image processing circuit contained in the ASIC 18. The image processing executed herein includes a nonlinear correction process, an error diffusion process, or a halftone process such as a screening process. An image processing result 703 obtained by the image processing unit 702 is accumulated in the image memory 111 included in the storage device 11, and simultaneously input to a correction target detection unit 704.

The correction target detection unit 704 specifies pixels where the sweep-up can occur based on a correction width parameter 706 set by the parameter setting unit 705 with reference to pixel data contained in the input image processing result 703, and outputs an analyzing result 709. The sweep-up phenomenon is reduced by correcting the exposure intensity of the specified pixels to lower the consumption amount of the toner 13. The correction width parameter 706 retained in the parameter setting unit 705 is constituted by a pixel number of a correction detection target, and the correction target. When the value of the correction width parameter 706 is 15, for example, each pixel positioned at a distance up to 15 from the edge of the image area is determined as a correction detection target and a correction target. The correction width parameter 706 may be set to an equal value with respect to a continuation width of black pixels and a continuation width of white pixels, or may be set to values different from each other. When the correction width parameters for black pixels and white pixels are set to 15 and 10, respectively, 25 pixels are determined as correction detection targets.

The correction target detection unit 704 specifies sweep-up target pixels based on the input image data 703, and outputs the obtained result to a subsequent processing unit as a correction signal, identification (ID) 709. The parameter setting unit 705 outputs a table value corresponding to the correction signal ID 709 (a correction value corresponding to an area where the sweep-up occurs and a correction value corresponding to a pixel position stored in the LUT 112) to the subsequent processing unit. A PWM control unit 710 receives image data 708 output from the image memory 111, the correction signal ID 709 output from the correction target detection unit 704, and a table value 707 output from the parameter setting unit 705.

PWM control is performed based on the table value 707. A configuration and an operation of the PWM control unit 710 will be detailed below. A plurality of pieces of image data in the sub scanning direction are necessary for correction target determination by the correction target detection unit 704, accordingly the image data 708 is input to the PWM control unit 710 from the image memory 111 at adjusted timing.

A detection operation executed by the correction target detection unit 704 is described with reference to other drawings. FIG. 8A illustrates image data contained in the image processing result 703. When a halftone process is included in the image processing executed by the image processing unit 702, black data and white data in FIG. 8A become '1' and '0', respectively. In a case of multi-value density data output from the image processing unit 702 during the image processing, black data and white data become '255' and '0', respectively, when the bit accuracy for output pixel data is 8 bits.

An edge of image data illustrated in FIG. 8A is detectable regardless of whether the output result from the image processing unit 702 is a halftone processing result or a multi-value output result. However, detection of an edge to specify target pixels where the sweep-up occurs is not detection for each pixel. That is, the sweep-up occurs within a predetermined width of a high density area from an edge, in a case where high density pixels (black pixels) continues for a predetermined width in the sub scanning direction, and low density pixels (white pixels) continues for a predetermined width in the sub scanning direction. Accordingly, to specify correction target pixels where the sweep-up occurs, it is necessary to provide, within the correction target detection unit 704, a storage unit (not illustrated) which stores pixel data corresponding to the sum of a parameter indicating a continuation width of black pixels, and a parameter indicating a continuation width of white pixels. These parameters are set in the correction width parameter 706 for each pixel in the main scanning direction.

In FIG. 8A, areas 801 to 811 indicated by broken lines correspond to areas where the sweep-up phenomenon occurs. Each of the areas 801 to 811 is an area where black pixels continue in the sub scanning direction, and subsequently white pixels (low density area) continue in the sub scanning direction. According to the present exemplary embodiment, each of the continuation width of black pixels and the continuation width of white pixels is set to 15. Accordingly, the correction target detection unit 704 requires a memory for retaining pixel data for at least 30 lines in the sub scanning direction.

FIG. 8B illustrates the enlarged area 810. FIG. 8B illustrates single pixels 820, and an edge position 821. The number of lines (number of pixels) from the edge position 821 to a position 822 is 15, while the number of lines (number of pixels) from the edge position 821 to a position 823 is 15. According to the present exemplary embodiment, each of the continuation width of black pixels and the continuation width of white pixels is set to 15. Accordingly, the correction target detection unit 704 determines pixel data from the edge position 821 to the position 822 as a sweep-up target area based on pixel data contained in a portion from the position 822 to the position 823 in the area 810 illustrated in FIG. 8B.

FIG. 9 indicates a relationship between a sub scanning position in the area 810 and a toner use amount. FIG. 9 indicates a toner use amount 901 at a corresponding sub scanning position. FIG. 8B and FIG. 9 are correlated such that the positions 822, 821 (edge position), and 823 correspond to sub scanning positions 902, 903, and 904, respectively. As can be understood from FIG. 9, the toner use amount in the portion from the sub scanning position 903 (edge position) to the sub scanning position 902 is larger than the toner use amount in a portion of sub scanning positions on the front side (left side in FIG. 9) of the sub scanning position 902, although the same high density (black pixel) is reproduced in both portions. In addition, an increase in the toner use amount is larger on the rear side (right side in FIG. 9) of the sub scanning position 902 corresponding to an increase start point of the toner use amount, and on the front side (left side in FIG. 9) of the sub scanning position 903 (edge position). There is a tendency that the increase in the toner use amount is smaller at the start point or the edge position.

Accordingly, the correction process of the sweep-up is executed for pixels in a high density area between the sub scanning position 902 and the sub scanning position 903 (edge position). The correction amount of the sweep-up needs to increase in an intermediate area between the sub scanning position 902 and the sub scanning position 903 (edge position), and decrease as the distance from this area becomes longer.

The correction process of the sweep-up is realized based on PWM control according to the present exemplary embodiment. In the PWM control, sub-pixels are subdivided from one pixel, and exposure is switched ON/OFF in units of sub-pixels. FIG. 8C illustrates replacement of a constitution of black pixels based on the PWM control. It is assumed in the following PWM control one sub pixel corresponds to 1/16 of one pixel. However, each sub pixel in the exemplary embodiment is not limited to 1/16. For example, one sub pixel may be 1/32 of one pixel, or 1/64 of one pixel.

(1) in FIG. 8C replaces one sub pixel (1/16 pixel (smaller than 1 pixel)) of a black pixel with a corresponding amount of white pixel. Similarly, (2), (3), and (4) replace two sub pixels (2/16 pixel (smaller than 1 pixel)), three sub pixels (3/16 pixel (smaller than 1 pixel)), and four sub pixels (4/16 pixel (smaller than 1 pixel)) with corresponding amounts of white pixel, respectively.

Accordingly, an exposure amount is finely adjustable by replacement of identical black input pixels with black pixel data having different sub-pixel constitutions based on the PWM control. Adjustment of the exposure amount enables adjustment of a toner amount to be finally used, so that the PWM control realizes correction of sweep-up target pixels.

More specifically, line data 824 and line data 825 corresponding to positions near the position 822 in FIG. 8B are located close to the increase start point of the toner use amount. In this case, control is performed to set each correction amount for the respective data 824 and 825 to a small value. In other words, black pixels are replaced in the manner illustrated in (1) in FIG. 8C. The toner amount for line data 826 located in the range from the position 822 toward the rear end in the sub scanning direction increases due to the sweep-up phenomenon, so that black pixels are replaced in the manner illustrated in (2) in FIG. 8C, for example. Each of the toner amounts for line data 827 and line data 828 located in the range from the position 822 further toward the rear end in the sub scanning direction more increases due to the sweep-up phenomenon, so that black pixels are replaced in the manner illustrated in (3) in FIG. 8C. Similarly, the more the number of white sub pixels for replacement increases, the more the position of line data (828) shifts from the position 822 toward the rear end in the sub scanning direction. However, as illustrated in FIG. 9, the toner use amount of the sweep-up target pixels decreases as the sub scanning position approaches the sub scanning position 903 (edge position, i.e., position 821). Accordingly, control is performed to replace more black pixels containing lower amounts of white sub pixels (such as (1) and (2) in FIG. 8C), as the sub scanning position approaches more closely the position 903.

However, when uniform replacement of black pixels is executed for the range from the increase start point of the toner use amount to the edge position in the sweep-up target area, problems arise in view of radio frequency interference (RFI (high-frequency noise)) of the image forming apparatus. The uniform replacement of black pixels in this context refers to replacement with black pixels having fixed sub pixel constitution. This problem is caused by uniformalization of the sub pixel constitution of black pixels after replacement since the increase start point of the toner use amount or the edge position is fixed in the case where image data contains a wide high density area in the main scanning direction. When black pixels after replacement are uniformalized, inherent high-frequency components produced by replacement increases. For example, when replacement of black pixels in the manner as (1) in FIG. 8C is continued in the main scanning direction, intervals of white sub pixels become constant. In this case, high-frequency components are not produced in the pixel constitution because all sub pixels before replacement. However, high-frequency components are produced after replacement corresponding to the sub pixel constitution of the black sub pixels after replacement. Generated high-frequency noise requires noise suppression measures for the image forming apparatus, and thus increases the cost of the apparatus.

Therefore, according to the present exemplary embodiment, control is performed to reduce uniformalized high-frequency noise generated by replacement. In FIG. 8B, for example, continuous replacement in the manner in (1) in FIG. 8C for the line data 824 constituted by N pixels causes replacement with black pixels each containing one white sub pixel, thereby generating high-frequency noise at a frequency corresponding to intervals of white sub pixels. Accordingly, control is performed such that black pixels are replaced not with black pixels each having a uniformalized sub pixel constitution, but with black pixels containing different sub pixel constitutions. More specifically, for each of the line data 824 and 825 constituted by N pixels, black pixels are replaced with a mixture of black pixels each having the sub pixel constitution of (1) in FIG. 8C, and black pixels each having sub pixel constitution of (2) in FIG. 8C (for M pixels), as illustrated in (1) in FIG. 10A. Moreover, for the line data 826 constituted by N pixels, black pixels are replaced with a mixture of black pixels each having the sub pixel constitution of (2) in FIG. 8C, and black pixels each having sub pixel constitution of (3) in FIG. 8C, as illustrated in (2) in FIG. 10A. In this manner, replacement with black pixels containing a larger number of white sub pixels than the original number of white sub pixels disturbs cycles of white sub pixels, thereby preventing generation of high-frequency noise at a particular frequency.

However, this control does not always replace black pixels with black pixels containing a larger number of white sub pixels. Replacement with black pixels containing a larger number of white sub pixels may excessively reduce the toner amount, particularly with respect to pixels using a larger amount of toner due to the sweep-up phenomenon. For example, replacement of pixels each containing 8 white sub pixels (8 black sub pixels) with black pixels each containing a larger number of white sub pixels (9 white sub pixels) produces black pixels each containing 7 black sub pixels after replacement. In this case, black pixels are generally replaced with pixels close to white. This excessive correction of the toner use amount due to the sweep-up phenomenon may cause a problem in reproduction of black pixels (high density).

According to the present exemplary embodiment, control is performed such that the parameter setting unit 705 switches black pixels to be mixed at the time of replacement based on a threshold parameter set beforehand. In other words, mixing of black pixels each containing a larger number of white sub pixels, and mixing of black pixels each containing a smaller number of white sub pixels are changed based on the threshold parameter. More specifically, black pixels each containing a threshold or a smaller number of white sub pixels are replaced with black pixels each containing a larger number of white sub pixels. On the other hand, black pixels each containing a larger number of white sub pixels than the threshold are replaced with black pixels each containing a smaller number of white sub pixels.

Figure 10A:
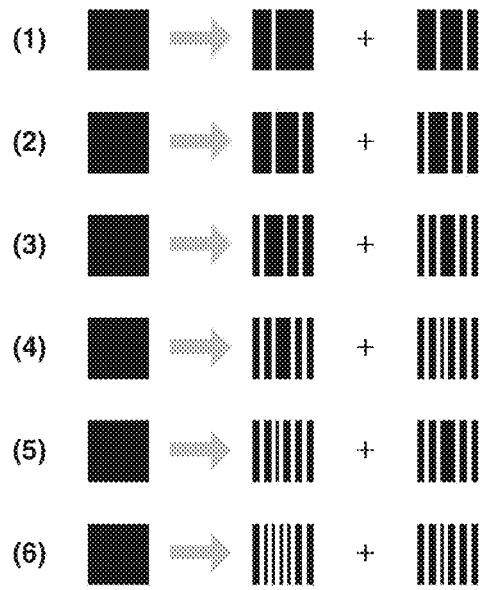
FIGS. 10A to 10D are diagrams illustrating replacement of sweep-up target pixels.

FIG. 10A illustrates an example of control when the threshold parameter is set to 4. When correction target pixels showing the sweep-up phenomenon are replaced with black pixels each containing 4 or a smaller number of white sub pixels since the threshold parameter is 4 ((1) to (4) in FIG. 10A), an increased number of white sub pixels are mixed with the black pixels each containing 4 or a smaller number of white sub pixels. For example, the line data 824 in FIG. 8B is (1) in FIG. 10A, i.e., replaced with a mixture of black pixels each containing 1 white sub pixel, and black pixels each containing 2 white sub pixels.

When correction target pixels of the sweep-up phenomenon are replaced with black pixels each containing 5 or a larger number of white sub pixels ((5) and (6) in FIG. 10A), black pixels each containing a decreased number of white sub pixels are mixed with the black pixels each containing 5 or a larger number of white sub pixels. For example, correction target pixels are replaced with a mixture of black pixels each containing 5 white sub pixels to which black pixels each containing 4 white sub pixels are mixed ((5) in FIG. 10A).

Figure 10B:
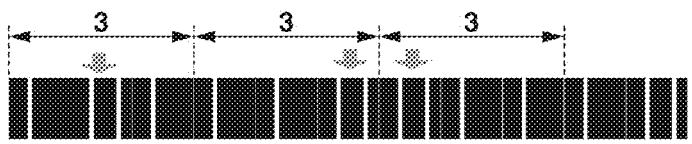
Figure 10C:
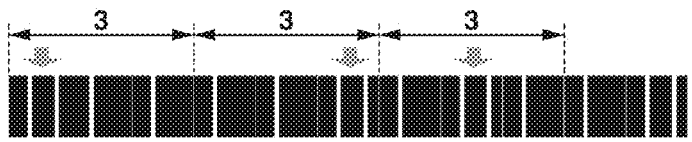
Figure 10D:
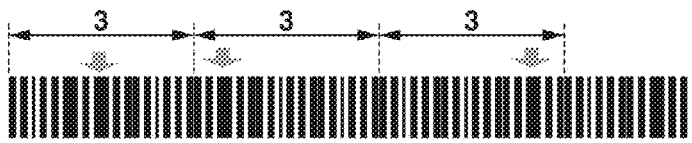

According to the present exemplary embodiment, uniformalization of black pixel positions to be mixed is also avoided. For example, the parameter setting unit 705 stores mixing cycles and mixing numbers for random control according to the parameters. FIGS. 10B, 10C, and 10D are examples indicating the mixing cycle of 3 and the mixing number of 1, respectively. The random control for the mixing position in this manner avoids generation of uniformalized high-frequency components even in a state of the same mixing cycle. This random control may be changed according to input of the image data 708 for each line. In this case, the randomness of replacement with black pixels containing different numbers of white sub pixels further increases, therefore dispersion of high-frequency components further improves.

The line data 824 and the line data 831 in FIG. 8B correspond to the start point of the sweep-up phenomenon, and the edge position, respectively. Correction of the sweep-up phenomenon reduces correction amounts at both the start point and the edge position, therefore each of these line data needs to be replaced with black pixels each containing a smaller number of white sub pixels. When black pixel mixing control is always performed in the same cycle or at the same position, the same high-frequency components are generated at replacement positions of black pixels having the same sub pixel constitution. According to the control in the present exemplary embodiment, however, generated high-frequency components are variable even in case of replacement of black pixels having the same sub pixel constitution. In other words, the high-frequency noise level of the image forming apparatus can be lowered. In the present exemplary embodiment, the mixing cycle and the mixing number are set to 3 and 1, respectively. However, the mixing cycle and the mixing number in the present exemplary embodiment are not limited to these examples.

Figure 11:
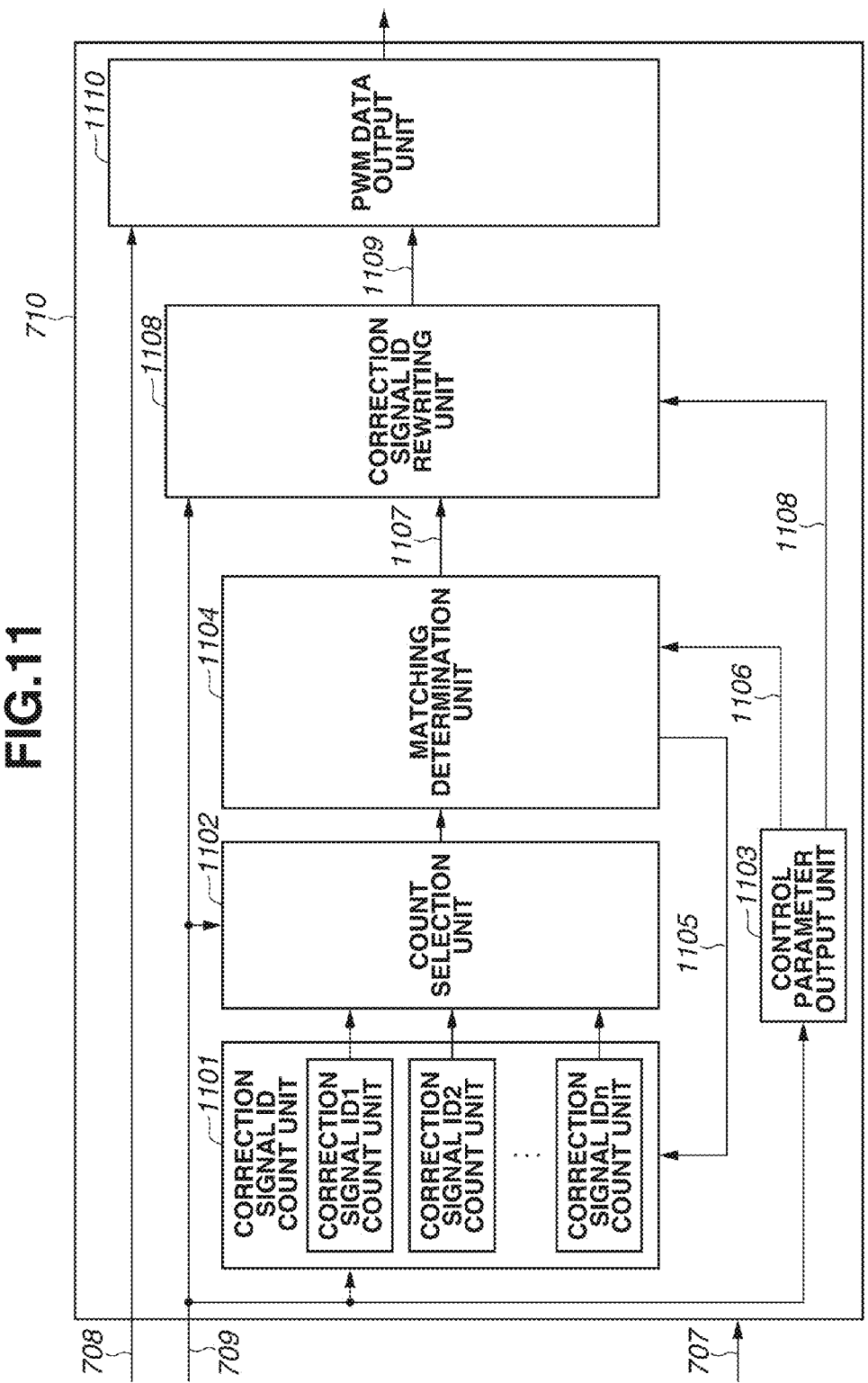
FIG. 11 is a block diagram illustrating a configuration of a pulse width modulation (PWM) control unit.

A configuration of the PWM control unit 710 is described. FIG. 11 is a diagram illustrating the configuration of the PWM control unit 710. Configurations in FIG. 11 similar to the configurations illustrated in FIG. 7 are given similar reference numbers. A correction signal ID count unit 1101 includes count units for checking continuity of values of the correction signal ID 709. A count selection unit 1102 selectively outputs correction signal ID counted values corresponding to the values of the correction signal ID 709. A control parameter output unit 1103 outputs parameters associated with replacement execution cycles and replacement execution positions corresponding to the respective correction signals ID 709. A matching determination unit 1104 compares output from the count selection unit 1102 and output from the control parameter output unit 1103, and determines a replacement cycle and a replacement position. The matching determination unit 1104 outputs a reset signal 1105 to the correction signal ID count unit 1101 when the replacement cycle is determined. In addition, the matching determination unit 1104 outputs a determination signal 1107 indicating a replacement position when the replacement position is determined.

A correction signal ID rewriting unit 1108 rewrites a value of the correction signal ID 709 according to a threshold parameter 1108 output from the control parameter output unit 1103 and the value of the determination signal 1107.

When the determination signal 1107 output from the matching determination unit 1104 is confirmed in a state that "4" is output from the control parameter output unit 1103 as the value of the threshold parameter 1108, for example, the correction signal ID is rewritten based on the value of the correction signal ID 709. More specifically, when the correction signal ID 709 is smaller than 4 at this point, the correction signal ID is rewritten to increase the number of contained white sub pixels. When the correction signal ID 709 is 4 or larger, the correction signal ID is rewritten to decrease the number of contained white sub pixels. A rewritten correction signal ID 1109 is output to the subsequent processing unit. A PWM data output unit 1110 executes exposure control based on the image data 708 and the rewritten correction signal ID 1109 output from the correction signal ID rewriting unit 1108.

FIGS. 12A to 12F illustrate PWM tables and PWM output signal statuses adopted by the PWM data output unit 1110. The correction signal ID 1109 output from the correction signal ID rewriting unit 1108 becomes 0 when the image data 708 does not contain correction target pixels of the sweep-up phenomenon, or becomes a value other than 0 when the image data 708 contains correction target pixels of the sweep-up. When the image data 708 does not contain the sweep-up target, the PWM data output unit 1110 executes the PWM control based on the PWM table illustrated in FIG. 12A. In this case, the PWM table value becomes 0x0000 when the image data 708 indicates 0 (white pixel data). Output signals are generated in units of sub pixels under the PWM control, therefore the adopted table values are output from low-order bits for 16 cycles. In other words, "0" in units of sub pixels is output in 16 cycles. When the image data 708 indicates 1 (black pixel data), the PWM table value becomes 0xFFFF. Accordingly, in this case, "1" in units of sub pixels is output in 16 cycles. Each of waveforms illustrated in the right parts in FIGS. 12A to 12F indicates output of black pixel data in the corresponding correction signal ID.

When the image data 708 corresponds to correction target pixels of the sweep-up phenomenon (i.e., when the correction signal ID 1109 is other than 0), the PWM data output unit 1110 executes the PWM control based on the PWM table corresponding to the value of the correction signal ID 1109 and selected from the PWM tables in 12B to 12F. When both the value of the correction signal ID 1109 and the image data 708 indicate 1 (image data 708: black pixel data), for example, the PWM table value to be adopted becomes 0xFF7F. Accordingly, in this case, "1" in units of sub pixels is initially output in 7 cycles. Then, "0" is output for 1 cycle, and thereafter "1" is again output in 8 cycles.

Alternatively, when the image data 708 corresponds to correction target pixels of the sweep-up phenomenon in a state that the values of the correction signal ID 1109 and the image data 708 indicate 3 and 1, respectively (image data 708: black pixel data), the PWM table value to be adopted becomes 0xBF77. In this case, "0" is output in the 4th, 8th, and 15th cycle of PWM output, and "1" is output for the other output cycles. Accordingly, the PWM data output unit 1110 executes the PWM control according to the value of the correction signal ID 1109 appropriately rewritten by the correction signal ID rewriting unit 1108, and the value of the image data 708. Since the output from the PWM data output unit 1110 has been subjected to correction of the sweep-up phenomenon, excessive consumption of toner caused by the sweep-up phenomenon is avoidable.

Figure 13:
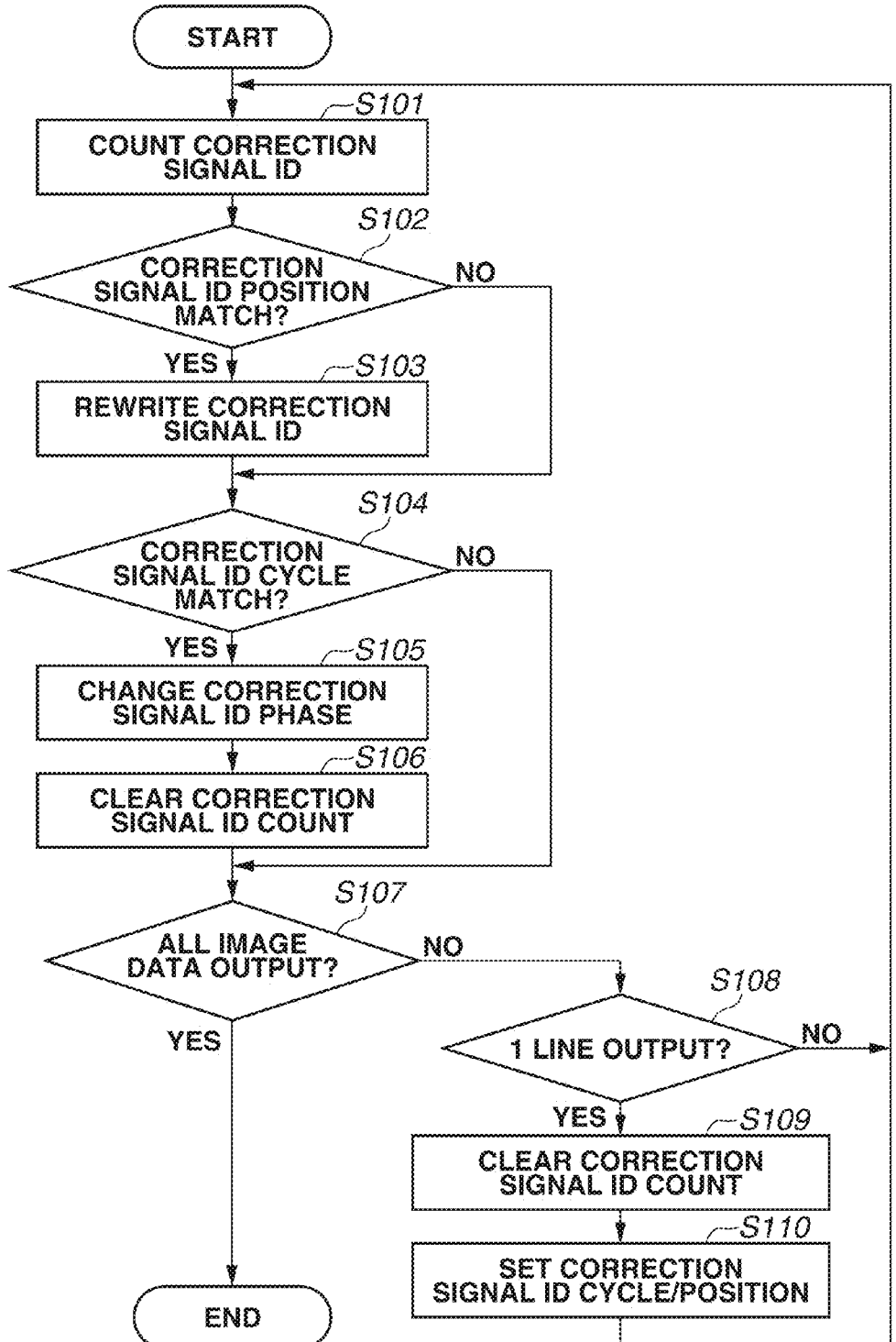
FIG. 13 is a flowchart illustrating control by a CPU.

A control flow according to the present exemplary embodiment is described. FIG. 13 is a control flow executed by the CPU 10 included in the image calculation unit 9 according to the present exemplary embodiment. In step S101, the CPU 10 counts the correction signal ID 709 when the correction signal ID 709 output from the correction target detection unit 704 corresponds to correction target pixels of the sweep-up phenomenon. When the value counted in step S101 does not match a replacement target position indicated by the control parameter output unit 1103, i.e., a rewriting position of the correction signal ID 709 (No in step S102), the CPU 10 shifts to a subsequent determination. When the value counted in step S101 matches the replacement target position indicated by the control parameter output unit 1103, i.e., the rewriting position of the correction signal ID 709 (Yes in step S102), in step S103, the CPU 10 rewrites the correction signal ID 709. In this case, contents of rewriting given to the correction signal ID 709 in step S102 are variable according to the threshold output from the control parameter output unit 1103. When the value of the correction signal ID 709 is smaller than the threshold, the correction signal ID 709 is increased. When the value of the correction signal ID 709 is equal to or larger than the threshold, the correction signal ID 709 is decreased. It is assumed that these increase and decrease of the correction signal ID in the rewriting are controlled such that the number of white sub pixels increases as the value of the correction signal ID increases. However, the manner of increase and decrease of the correction signal ID in the exemplary embodiment is not limited to this example. In case of a structure where the number of white sub pixels decreases as the value of the correction signal ID increases, the directions of the increase and decrease of the correction signal ID 709 for rewriting in step S103 are reversed. According to the present exemplary embodiment, therefore, it is essential to compare the threshold output from the control parameter output unit 1103 and the input correction signal ID 709, and rewrite the correction signal ID 709 in a manner appropriate for correction of the sweep-up phenomenon based on the comparison result.

After completion of the determination process in step S102 (including rewriting of the correction signal ID 709), in step S104, the CPU 10 executes cycle determination of the correction signal ID 709. When the count value in step S101 matches the replacement cycle output from the control parameter output unit 1103 (Yes in step S104), in step S105, the CPU 10 changes the position for replacing with black pixels having different white sub pixel constitution, in the subsequent cycle. In step S106, the CPU 10 clears the count value of the correction signal ID. In step S104, when the count value in step S101 does not match the replacement cycle output from the control parameter output unit 1103 (No in step S104), the CPU 10 shifts to a subsequent process.

When the process for the entire input image data, i.e., all the image data 708 is not completed (No in step S107), in step S108, the CPU 10 determines whether the process of the image data 708 for one line has been completed. In step S108, when the process of the image data 708 for one line is not completed (No in step S108), the processes from step S101 to step S106 are continuously executed. In step S108, when it is determined that the process of the image data 708 for one line has been completed (Yes in step S108), in step S109, the CPU 10 clears the count value of the correction signal ID. In step S110, the CPU 10 sets the replacement position and the replacement cycle of the correction signal ID. In step S110, the replacement position and the replacement cycle of the correction signal ID are changed for each input of the image data 708 of one line, therefore the randomness of generation of high-frequency components increases.

Figure 14:
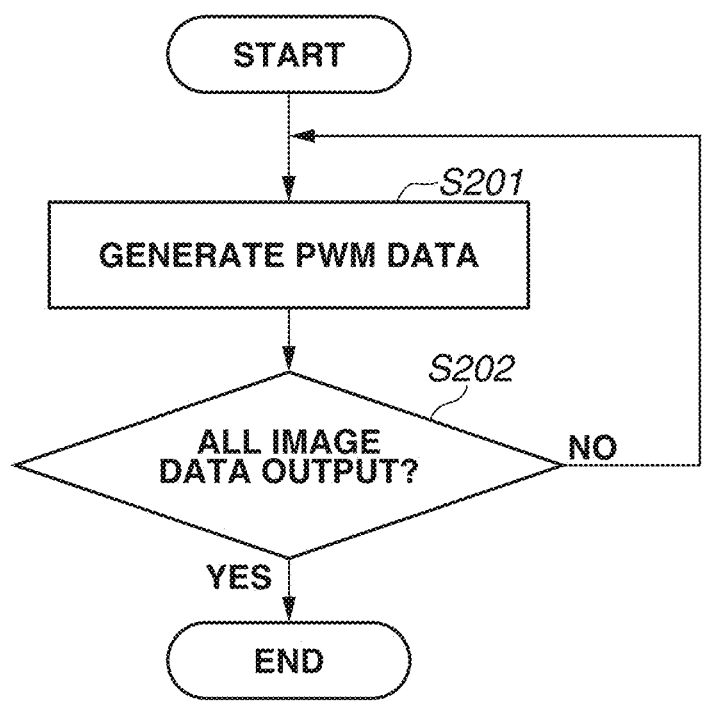
FIG. 14 is a flowchart illustrating control by the PWM control unit.

The PWM control according to the correction signal ID generated by the CPU 10 is described. FIG. 14 is a diagram illustrating a control flow of the PWM data output unit 1110. In step S201, the PWM data output unit 1110 outputs PWM data based on the PWM table corresponding to the correction signal ID generated by the CPU 10. The correction signal ID used herein is a signal in which correction target pixels for the sweep-up phenomenon (rewriting of correction signal ID) have been corrected by the CPU 10, therefore the PWM data output unit 1110 executes the PWM control simply based on the PWM table corresponding to the correction signal ID. More specifically, the PWM data output unit 1110 outputs values of the corresponding PWM table from low-order bits according to the PWM cycle. In step S202, the PWM data output unit 1110 continues the process in step S201 until completion of the process for all the input image data, i.e., all the image data 708.

According to the present exemplary embodiment described above, the PWM table to be used is changeable by rewriting the correction signal ID according to a determination result of a sweep-up phenomenon target area (target pixels) obtained based on input image data. Accordingly, PWM data for ON/OFF control of exposure is appropriately changeable, so that reduction of a toner amount used for the sweep-up target area (target pixels) is achievable. Moreover, reduction of high-frequency components can be realized as well as correction of the sweep-up phenomenon based on the control in a manner avoiding uniformalization of the rewriting position of the correction signal ID.

According to the first exemplary embodiment, the CPU 10 or the correction signal ID rewriting unit 1108 executes control to increase or decrease the correction signal ID at the replacement position according to the threshold at which the control parameter output unit 1103 outputs the correction signal ID 709 of the sweep-up target area (target pixels). However, according to a second exemplary embodiment, a process for increasing and decreasing the correction signal ID for all sweep-up target areas (target pixels) is executed. In the case of replacement of an area (pixels) with black pixels each containing 1 white sub pixel, for example, control to increase or decrease the number of white sub pixels is executed only at the position of replacement in order to avoid generation of high-frequency components according to the first exemplary embodiment.

However, according to the present exemplary embodiment, in the case of replacement of an area (pixels) with black pixels each containing 1 white sub pixel, replacement control is performed to mix black pixels containing no white sub pixel, i.e., black pixels not to be replaced with black pixels each containing 2 white sub pixels in the same ratio.

Figure 15A:
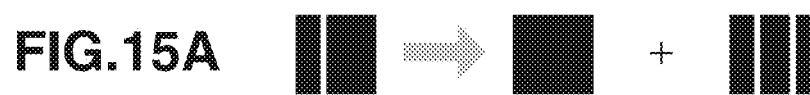
FIGS. 15A to 15E are diagrams illustrating replacement of sweep-up target pixels according to a second exemplary embodiment.
Figure 15B:
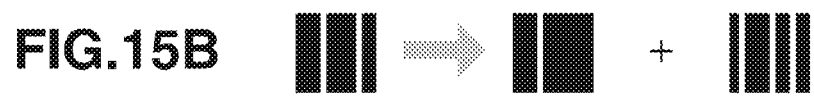
Figure 15C:
Figure 15D:
Figure 15E:

More specifically, the correction signal ID is controlled to be replaced with the correction signal ID in which white sub pixel constitution is set to be larger by +1 or smaller by −1 compared with the white sub pixel constitution indicated by the correction signal ID before replacement. FIGS. 15A to 15E illustrate these constitutions. Among FIGS. 15A to 15E, FIG. 15A shows that black pixels each containing no white sub pixel are mixed with black pixels each containing 2 white sub pixels, in the same ratio in a target area (target pixels) to be replaced with black pixels each containing 1 white sub pixel. Similarly, FIG. 15B shows that black pixels each containing 1 white pixel are mixed with black pixels each containing 3 white sub pixels, in the same ratio in a target area (target pixels) to be replaced with black pixels each containing 2 white sub pixels. In this case, the mixing cycle is set to a number larger than 2. This is because if the rewriting cycle is set to 2, black pixels after replacement in the sweep-up phenomenon target area (target pixels) are alternately repeated, in which condition inherent high-frequency components may be produced. According to the present exemplary embodiment, therefore, the rewriting cycle is set to a longer cycle to avoid a repeat of the white sub pixel constitution in each black pixel after rewriting. In this case, the cycle is randomly controlled, and a repeat of replacement is avoided even at the same replacement ratio. According to the present exemplary embodiment, the values for increase and decrease are set to +1 and −1. However, the values for increase and decrease in the present exemplary embodiment are not limited to these values. The values for increase and decrease may be set to +2 and −2 in the same replacement ratio. Alternatively, the values for increase and decrease may be set to various values within a range (from +2 to −2) to produce various combinations appropriate for obtaining the target number of white sub pixels.

According to the present exemplary embodiment, therefore, reduction of high-frequency components is achievable based on rewriting of the correction signal ID for all the target areas (target pixels) of the sweep-up phenomenon.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-223577, filed Oct. 31, 2014, which is hereby incorporated by reference herein in its entirety.

What is claimed is:

1. An image forming apparatus, comprising:
an acquisition unit configured to acquire an area in which, in image data, pixels with more than a predetermined density are successive in a main scanning direction and in a sub scanning direction; and
a correction unit configured to, on a basis of a distance from an edge portion of the area acquired by the acquisition unit to a target pixel in the acquired area, correct a value of the target pixel,
wherein, in correction of the value of the target pixel by the correction unit, the target pixel is sub-divided into sub pixels, and decreases a density on a sub-pixel-by-sub-pixel basis,
wherein the number of sub pixels that decreases a density in the target pixel is varied on a basis of the distance, and
wherein, in an area in which a plurality of pixels is successive in the main scanning direction including the target pixel, the number of sub pixels that decreases a density for at least one of the plurality of pixels is different from the number of sub pixels that decreases a density in the target pixel.

2. The image forming apparatus according to claim 1, wherein pulse width modulation control is used for the correction, for decreasing a density, performed on the sub-pixel-by-sub-pixel basis.

3. The image forming apparatus according to claim 1, wherein the correction unit sets the number of sub pixels that decreases a density to be K (where K is a natural number) for M pixels among N pixels that are included in the area successively in the main scanning direction (N>M) and sets the number of sub pixels that decreases a density to be K−1 for remaining pixels among the N pixels.

4. The image forming apparatus according to claim 3, wherein the M pixels are determined randomly from among the N pixels included in the area successively in the main scanning direction.

5. The image forming apparatus according to claim 1, wherein, in a case where the number of sub pixels that decreases a density is two or more, the correction unit corrects sub pixels located at non-successive positions in the target pixel.

6. An image forming method, comprising:
acquiring an area in which, in image data, pixels with more than a predetermined density are successive in a main scanning direction and in a sub scanning direction; and
correcting a value of the target pixel, on a basis of a distance from an edge portion of the acquired area to a target pixel in the acquired area,
wherein, in correction of the value of the target pixel, the target pixel is sub-divided into sub pixels, and decreases a density on a sub-pixel-by-sub-pixel basis,
wherein the number of sub pixels that decreases a density in the target pixel is varied on a basis of the distance, and
wherein, in an area in which a plurality of pixels is successive in the main scanning direction including the target pixel, the number of sub pixels that decreases a density for at least one of the plurality of pixels is different from the number of sub pixels that decreases a density in the target pixel.

7. A non-transitory computer readable storage medium storing a program for causing a computer to perform the following steps of:

acquiring an area in which, in image data, pixels with more than a predetermined density are successive in a main scanning direction and in a sub scanning direction; and correcting a value of the target pixel, on a basis of a distance from an edge portion of the acquired area to a target pixel in the acquired area, wherein, in correction of the value of the target pixel, the target pixel is sub-divided into sub pixels, and decreases a density on a sub-pixel-by-sub-pixel basis, wherein the number of sub pixels that decreases a density in the target pixel is varied on a basis of the distance, and wherein, in an area in which a plurality of pixels is successive in the main scanning direction including the target pixel, the number of sub pixels that decreases a density for at least one of the plurality of pixels is different from the number of sub pixels that decreases a density in the target pixel.

* * * * *